May 1, 1923.
H. E. BRIAIS
DIFFERENTIAL FOR MOTOR VEHICLES
Filed April 6, 1922
1,453,909
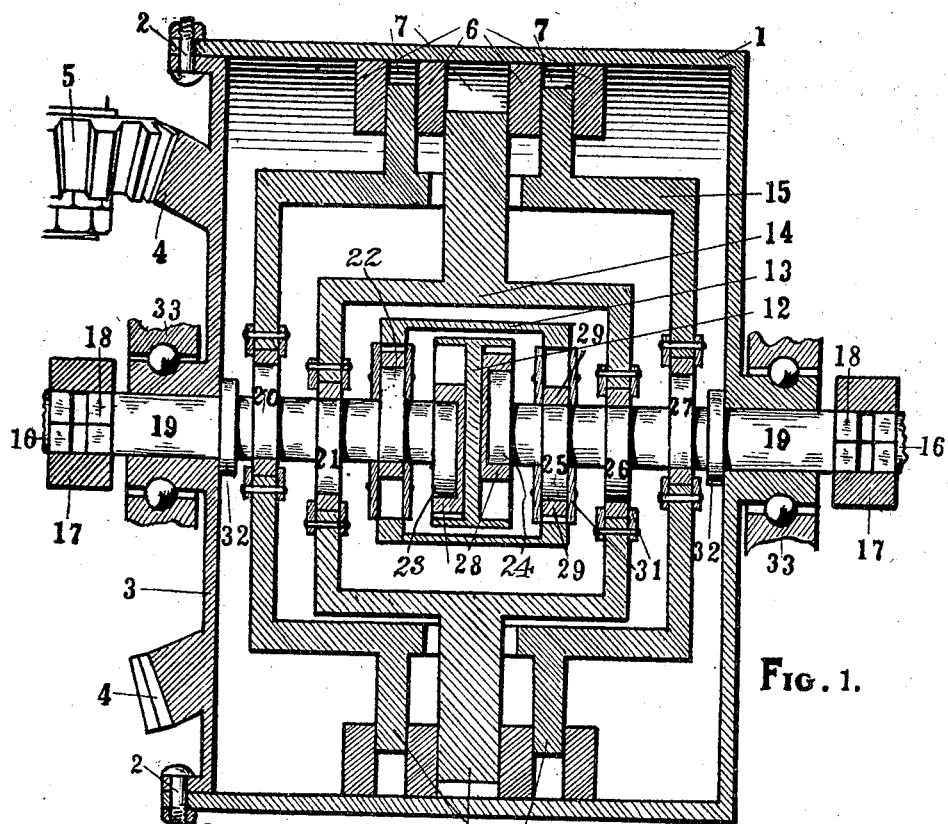
Fig. 1.
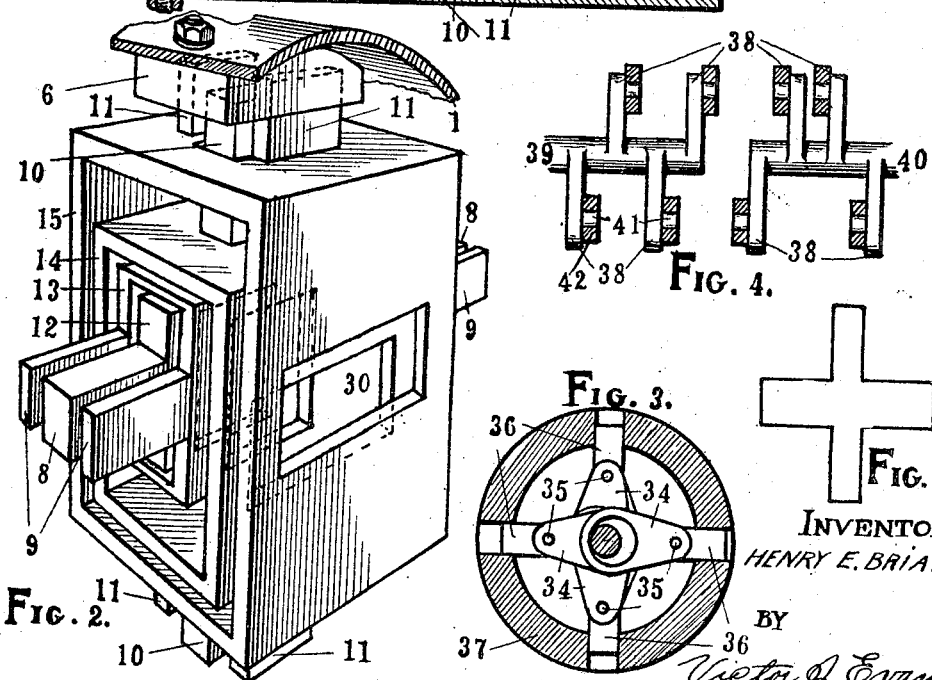
Fig. 2.
Fig. 3.
Fig. 4.
Fig. 5.
INVENTOR
HENRY E. BRIAIS.
BY
Victor J. Evans
Atty.

Patented May 1, 1923.

1,453,909

UNITED STATES PATENT OFFICE.

HENRY E. BRIAIS, OF NEW YORK, N. Y.

DIFFERENTIAL FOR MOTOR VEHICLES.

Application filed April 6, 1922. Serial No. 550,083.

*To all whom it may concern:*

Be it known that I, HENRY E. BRIAIS, a citizen of the United States, residing at New York city, in the county of New York and State of New York, have invented new and useful Improvements in Differential for Motor Vehicles, of which the following is a specification.

This invention relates to new and useful differential for motor vehicles, and the object is to provide a device which, while allowing the driving wheels of a motor vehicle to revolve at different speeds when turning corners as an ordinary differential will allow them to, will not permit the power to be divided differently between these wheels than is necessary for these turns, so that when one wheel is in a slippery place the other wheel will continue to drive the car, instead of having the slipping wheel spin round and absorb the entire power of the engine or motor, depriving the other wheel of its power to propel as it does with the type of differential commonly employed.

With this and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a sectional view, on a plane parallel with the axles of the car, of the form in which I would prefer to apply my principle.

Figure 2 is a perspective view intended to give a more complete illustration of several of the parts shown in section in Figure 1.

Figure 3 is an elevation, on a plane perpendicular to the axles, illustrating another manner in which my principle might be applied.

Figure 4 is an elevation on a plane with the axles of the car, of two shafts used in a third mode of application of my principle, and Figure 5 is an elevation, on a plane perpendicular to the axles, of the shape of certain grooves rendered necessary in the mode of application shown in Figure 4.

My device may be placed in the same position on the car as that in which any other differential may be placed, which is usually between the two portions of the jack shaft on a chain-driven vehicle or on an internal-gear-drive vehicle, and between the two portions of the live axle on a shaft-driven one. It may also be used on front-wheel-drive and on four-wheel-drive cars.

Referring to Figure 1, 1 is a cylindrical rim which is attached, by means of bolts, 2, 2, to a disk 3, which receives the power which is to be transmitted to the differential. The power might also be applied directly to the rim 1, on a surface integral with it, or forming part of it. This power may be transmitted by a bevel gear, 4, driven by a bevel pinion 5, as in my drawing, or by a worm, helical gear or other means, each make of car having its own way of carrying this power to its differential.

Inside the rim 1 are four blocks, one of which is shown in section at 6, Figure 1, and in perspective in 6, Figure 2, the others being omitted in the drawing to better expose the other parts. These blocks are bolted to the rim at intervals 90° apart and thus forced to turn with it. These blocks have radial ways 7, Figure 1, in which slide the projections 8, 9, 10 and 11, (see Figure 2,) of the blocks 12, 13, 14 and 15. Each of the three last blocks is hollow in the middle and thus surrounds the block next in size.

The blocks 12 and 13 are thus capable of sliding radially back and forth within the rim on one diameter, and the blocks 14 and 15 are capable of similarly sliding back and forth on a second diameter at right angles to the former, at the same time as all four reciprocating blocks are revolved by the rim.

The reciprocating block 15 has openings at opposite ends large enough to allow the projections 10, 10, of the block 14 to pass freely through, and is itself large enough inside to make it possible for itself and the block 14 to have some movement in opposite directions without colliding with each other. The blocks 12 and 13 are also able to move in opposite directions, any of the four blocks being able to have this reciprocating movement independently of any of the others.

The two portions of the live axle or of the jack shaft are shown in 16, 16, Figure 1. Their inner ends are square in cross section, and project part-way into the square openings of the parts 17, 17. The other ends of these openings receive the square ends, 18, 18, of the two shafts 19, 19; these shafts being thus able to force the two portions of the axle or jack shaft to turn or stop turning with them.

Each of these shafts 19 has, at certain intervals along its length, four short eccentric cams, making eight in all, numbered 20, 21, 22, 23, 24, 25, 26 and 27. The eccentrics 23 and 24 engage in the cylindrical openings of rectangular sliding pieces 28, 28, Figure 1, and all the other eccentrics engage cylindrical openings on other sliding pieces such as is numbered 29.

The work of these eccentrics can be best understood by considering them in pairs. Those numbered 23 and 24, which are placed on the inner ends of their respective shafts, have between them the reciprocating block 12. The rectangular sliding pieces 28, 28, which these eccentrics engage, are sunken in cavities in the walls of this block 12, as may be seen in Figure 1, and allowed to slide between parallel straight edges lining these cavities. These parallel straight edges are perpendicular to the directions in which the block 12 can reciprocate.

When the device is assembled, the shafts, 19, 19, are so turned that the eccentrics 23 and 24 are on opposite sides of the axle, for example, one pointing up and the other pointing down. When the block 12 is forced to turn by the revolving rim, these shafts are forced to turn too, because to resist this turning the eccentric 23 would have to drive the reciprocating block in one direction and the eccentric 24 would have to drive it in the opposite one, in other words they would have to tear it apart.

When the car is turning a corner, however, and one side of the car, as a result of turning the steering wheels, tends to carry itself round faster and the other slower than when going straight, the shafts 19, 19 are urged to turn at different speeds. This turning at different speeds causes the eccentrics 23 and 24, through the medium of their sliding pieces 28, to both push the block 12 in the same direction. If this difference in speeds is kept up the block 12 will slide back and forth within the rim as a means for allowing this difference in speed, at the same time as forcing both shafts to turn with it.

Though the eccentrics 23 and 24 are originally placed on opposite sides of the axle, however, the act of turning at different speeds will make them come together on the same side, and the moment they do this they lose their effectiveness, for their resistance to turning would no longer tend to tear the block 12 apart. In order to meet this situation a second pair of eccentrics 21 and 26 are provided working, through the medium of their rectangular sliding pieces 29, on the reciprocating block 14. The cavities in the walls of this block, one of which is shown in perspective in 30, Figure 2, are so placed that the straight edges along which the sliding pieces 29 must slide are perpendicular to those of the block 12. The eccentrics are so placed that when those working on the block 14 are opposite those working on the block 13 are not, and vice-versa, one pair of eccentrics being effective when the other pair is not.

In theory my principles would thus require only four eccentrics, two on each shaft, working on two reciprocating blocks such as 12 and 14, but if only these were used the shafts would be subjected to a considerable strain. This is due to the fact that, when one of the two pairs of eccentrics was working, it would be acting on each shaft from one side only and the tendency might be to bend that shaft instead of making it revolve. To meet this situation four more eccentrics and two more reciprocating blocks are provided, so that when the eccentrics 23 and 24 are working on their respective shafts each from one side, those numbered 22 and 25 are similarly working on the same shafts but each from the opposite side, their reciprocating block 13 being always effective or ineffective at the same time as the block 12. In a similar way the eccentrics 20 and 27, working on their reciprocating block 15, oppose the strain that might be caused by the eccentrics 21 and 26.

The rectangular sliding pieces 29 are held in their places and prevented from falling out by means of small slabs, shown in section in 31, Figure 1, which are riveted to the reciprocating blocks. 32, 32 are two collars to prevent the shafts from sliding out of place. 33, 33 represent the bearings on which the entire device may turn.

In the mode of construction shown in Figure 3, the eccentrics act directly on the arms 34, which are pivoted at 35 to the reciprocating blocks 36, these blocks being capable of sliding radially in ways in the rim 37. Difference in speeds of the revolving shafts will cause these arms 34, at the same time as rocking on their pivots, to reciprocate the blocks 36 like the blocks 12, 13, 14 and 15 of Figure 1. The model shown in my drawing has only four eccentrics, two on each shaft, but any number could be added, they having been omitted here only to simplify the appearance of those shown.

In the way in which my principle is applied in Figure 4, instead of using eccentrics I use what I consider slices of eccentrics in the shape of the eight arms or cranks 38 on the shafts 39 and 40. These arms have pins, 41, engaging sliding pieces 42 which correspond to those numbered 28 and 29 in Figure 1. These sliding pieces are supposed to engage reciprocating blocks as in Figure 1, but the three outer reciprocating blocks, besides having on opposite sides the cavities necessary for these sliding pieces, have second ones perpendicularly intersecting the first ones through their centers, to enable the reciprocating blocks to pass the shafts, giving these cavities or guide-ways the appearance of crosses as shown in Figure 5. The middle reciprocating block will not need this because of being between the shafts.

In none of the models shown will either driving wheel be able to absorb itself any more power than the situation requires, for if one wheel is on a slippery spot and able to turn easily and the other is on a rough spot, the latter cannot by its resistance, instead of propelling the car, cause the other to spin as it would with an ordinary differential, because while the wheels can reciprocate the blocks the blocks themselves cannot, by this mere act of sliding backwards or forwards, revolve the wheels. It would be possible to make the distance from the center of each eccentric to the center of its shaft, or from the pins on the cranks in Figure 4 to their shafts so great that the reciprocating blocks could revolve the wheels, but as this distance is decreased the effectiveness of the wheels on the blocks is increased and that of the blocks on the wheels is decreased till a satisfactory condition is reached. The differential is therefore always locked except for that measure of action required by the inducement given to the driving wheels by the act of steering the car.

What is claimed as new is:—

1. A differential mechanism comprising driving mechanism, a plurality of shafts to be driven, cams on said shaft, and a plurality of nested blocks between said shafts and driving mechanism, said blocks being operable by said cams as and for the purpose set forth.

2. A differential mechanism comprising driving mechanism, a plurality of shafts to be driven, and a plurality of nested blocks between said shafts and driving mechanism, as and for the purpose set forth.

3. A differential mechanism comprising driving mechanism, a plurality of shafts to be driven, a plurality of nested blocks between said driving mechanism and said shafts and operable by said driving mechanism to drive said shafts, and cams operable by said shafts for operating said blocks to effect a differential movement of said shafts.

4. A differential mechanism comprising a plurality of shafts, a plurality of cams on each of said shafts, and a plurality of nested blocks each operatively associated with a cam of each of said shafts.

5. A differential mechanism comprising a plurality of shafts, a plurality of cams on each of said shafts, and a plurality of nested blocks each operatively associated with a cam of each of said shafts.

6. A device of the class described comprising driving mechanism, slidable means driven by said mechanism, shafts operable by said slidable means, and cams on said shafts whereby said shafts may operate said slidable means.

7. A device of the class described comprising a plurality of shafts, cams thereon, blocks slidable at right angles to each other by said cams, and driving mechanism operatively connected to said blocks.

8. A device of the class described comprising a plurality of shafts, cams thereon, slides operable by said cams, blocks operable by said slides, and driving mechanism for said blocks.

In testimony whereof I have affixed my signature.

HENRY E. BRIAIS.